United States Patent
Qian et al.

(10) Patent No.: US 11,119,783 B2
(45) Date of Patent: Sep. 14, 2021

(54) CENTRALIZED AUTOMATION SYSTEM FOR RESOURCE MANAGEMENT

(71) Applicant: TD Ameritrade IP Company, Inc., Omaha, NE (US)

(72) Inventors: Chibo Qian, Great Neck, NY (US); Glenn Jared Komsky, Hoboken, NJ (US)

(73) Assignee: TD Ameritrade IP Company, Inc.

( * ) Notice: Subject to any disclaimer, the term of this patent is extended or adjusted under 35 U.S.C. 154(b) by 185 days.

(21) Appl. No.: 16/458,154

(22) Filed: Jun. 30, 2019

(65) Prior Publication Data

US 2020/0409714 A1    Dec. 31, 2020

(51) Int. Cl.
*G06F 9/48*       (2006.01)
*G06F 9/50*       (2006.01)
*G06F 11/20*      (2006.01)
*G06F 9/38*       (2018.01)

(52) U.S. Cl.
CPC .......... *G06F 9/3838* (2013.01); *G06F 9/4875* (2013.01); *G06F 9/5022* (2013.01); *G06F 11/2023* (2013.01)

(58) Field of Classification Search
CPC ... G06F 11/2023; G06F 9/4862; G06F 9/5022
See application file for complete search history.

(56) References Cited

U.S. PATENT DOCUMENTS

| | | | |
|---|---|---|---|
| 6,865,597 B1 * | 3/2005 | Bandopadhyay | G06F 3/0607 709/213 |
| 7,178,059 B2 | 2/2007 | Greenspan et al. | |
| 10,462,261 B2 | 10/2019 | Rajendran Pillai Sarojini et al. | |
| 2003/0226059 A1 | 12/2003 | Braun | |
| 2004/0205167 A1 | 10/2004 | Grumann | |
| 2008/0005367 A1 | 1/2008 | Barry et al. | |
| 2008/0140829 A1 | 6/2008 | Berbiguier et al. | |
| 2015/0007171 A1 | 1/2015 | Blake et al. | |
| 2018/0123876 A1 | 5/2018 | Tang et al. | |
| 2018/0314531 A1 * | 11/2018 | Rhodes | G06F 9/4492 |
| 2019/0372835 A1 * | 12/2019 | Featonby | H04L 41/0816 |

OTHER PUBLICATIONS

U.S. Appl. No. 16/371,062, filed Mar. 31, 2019, Glenn Jared Komsky.

* cited by examiner

*Primary Examiner* — Zachary K Huson

(74) *Attorney, Agent, or Firm* — Harness, Dickey & Pierce, PLC

(57) ABSTRACT

A data center management system includes at least one processor and a memory coupled to the at least one processor. The memory stores resource records that include (i) a name and (ii) dependency data of the resource. The memory stores instructions that, upon execution, cause the at least one processor to: in response to receiving a selection of one or more resources, (i) generate a resource group based on the dependency data of the selected one or more resources, (ii) organize resources in the resource group into one or more ordered components based on dependency data of each resource in the resource group, and (iii) generate a resource management page; display the resource management page; and, in response to receiving a failover request, stop every resource in the resource group at a first data center and start every resource in the resource group at a second data center.

20 Claims, 11 Drawing Sheets

| Type | URL | REC1 | REC1_LOC | REC2 | REC2_LOC | I/E/B | Group | App |
|------|-----|------|----------|------|----------|-------|-------|-----|
| A | www.abc.com | 216.105.251.X | DC1 | 198.200.171.Y | DC2 | E | s1 | App1:App2 |
| C | www.def.com | www-dc1.def.com | DC1 | dc2-wwww.def.com | DC2 | I | s1 | App1 |
| P | www.abc.com | 216.105.251.X | DC1 | 198.200.171.Y | DC2 | B | s2 | App2 |

FIG. 8

CENTRALIZED AUTOMATION SYSTEM FOR RESOURCE MANAGEMENT

FIELD

The present disclosure relates to the management of data centers and more particularly to automated computer control of data centers.

BACKGROUND

An organization may operate a pair of data centers that each host a collection of resources—such as applications, middleware, and databases. Each data center may host the same collection of resources and function as a backup for the other data center. For example, a failover may be performed between the two data centers, such that a set of resources hosted at one data center is stopped and the set of resources is started at the other data center. Traditionally, the resources in the data centers are managed by a team of operators. Each operator may (i) possess detailed knowledge of and (ii) be responsible for the management of specific resources and their respective execution environments—for example, what other resources they depend on. In addition to personally held knowledge, the details and instructions for managing the different resources may be documented.

The starting and stopping of resources is a manual process that must be performed on each resource. Large-scale work—such as system updates or failure recoveries—may require multiple operators manually executing instructions for each resource. Each operator must either rely on their personal knowledge or consult documentation for each resource. In addition, the operators may need to coordinate their efforts to stop and/or start various resources in a specific order, thus increasing the time and overhead required to carry out the work.

Although routine maintenance may be planned in advance, it is often scheduled during off-peak hours to minimize the effect on users of the impacted data centers. Thus, operators may need to be available during late-night hours or other non-standard working hours. Unexpected errors or issues may require the unscheduled and coordinated effort of multiple operators. During routine maintenance or issue resolution, it is desirable to include operators that possess the required knowledge to limit the required time and avoid or resolve issues that may arise.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A data center management system includes at least one processor and a memory coupled to the at least one processor. The memory stores a set of resource records. Each resource record of the set of resource records includes (i) a name of a resource hosted at a first data center and a second data center, and (ii) dependency data of the resource. The memory stores instructions that, upon execution, cause the at least one processor to, in response to receiving a selection of one or more resources via an operator portal, (i) generate a resource group based on the dependency data of the one or more selected resources, (ii) organize resources in the resource group into one or more ordered components based on dependency data of each resource in the resource group, and (iii) generate a resource management page for the resource group. The instructions further cause the at least one processor to display the resource management page and, in response to receiving a failover request via the operator portal, stop every resource in the resource group at the first data center and start every resource in the resource group at the second data center.

In other features, stopping every resource in the resource group at the first data center includes stopping each component of the one or more ordered components sequentially from first to last at the first data center. Stopping each component includes stopping each resource associated with the component. Starting every resource in the resource group at the second data center includes starting each component of the one or more ordered components sequentially from last to first at the second data center. Starting each component includes starting each resource associated with the component.

In further features, the dependency data of the resource includes at least one of a parent resource that must be stopped before the resource is stopped and a child resource that must be started before the resource is started. A first component of the resource group includes only resources that do not have an associated parent resource. A last component of the resource group includes only resources that do not have an associated child resource.

In other features, the memory stores one or more resource templates. Each template of the one or more resource templates includes a set of control elements. The instructions, upon execution, cause the at least one processor to, in response to receiving a request to register a new resource via the operator portal, prompt an operator to select a template of the one or more resource templates and, in response to receiving a selection of a first template, prompt the operator to provide (i) a name of the new resource and (ii) a description of the new resource. The instructions further cause the at least one processor to, in response to receiving (i) the name of the new resource and (ii) the description of the new resource, add a new resource record to the set of resource records. The new resource record includes the name of the new resource, the description of the new resource, and the set of control elements of the first template.

In further features, each element of the set of control elements includes a label, a default value, an order value, and one or more associated tasks. In yet further features, the one or more associated tasks includes at least one of start, stop, and status.

In other features, stopping every resource in the resource group at the first data center includes, for each resource in the resource group, (i) generating a stop instruction based on the set of control elements associated with the resource and (ii) executing the stop instruction at the first data center. Starting every resource in the resource group at the second data center includes, for each resource in the resource group, (i) generating a start instruction based on the set of control elements associated with the resource and (ii) executing the start instruction at the second data center.

In yet other features, the instructions, upon execution, cause the at least one processor to, in response to receiving a group status request, obtain a status of each resource in the resource group at the first data center and the second data center.

In other features, the instructions, upon execution, cause the at least one processor to, in response to receiving a request to stop a selected component, stop each resource associated with the selected component at one of the first data center and the second data center independent of dependency data of each resource associated with the selected component. In yet other features, the instructions, upon execution, cause the at least one processor to, in response to receiving a request to start a selected resource, start the selected resource at one of the first data center and the second data center independent of dependency data of the selected resource.

A data center management method includes storing a set of resource records in a management data store. Each resource record of the set of resource records includes (i) a name of a resource hosted at a first data center and a second data center, and (ii) dependency data of the resource. The method further includes receiving a selection, via an operator portal, of one or more resources, generating a resource group based on the dependency data of the one or more selected resources, and organizing resources in the resource group into one or more ordered components based on dependency data of each resource in the resource group. The method also includes generating a resource management page for the resource group, displaying, via the operator portal, the resource management page to a user, and, in response to receiving a failover request via the operator portal, (i) stopping every resource in the resource group at the first data center and (ii) starting every resource in the resource group at the second data center.

In other features, stopping every resource in the resource group at the first data center includes stopping each component of the one or more ordered components sequentially from first to last at the first data center. Stopping each component includes stopping each resource associated with the component. Starting every resource in the resource group at the second data center includes starting each component of the one or more ordered components sequentially from last to first at the second data center. Starting each component includes starting each resource associated with the component.

In further features, the dependency data of the resource includes at least one of a parent resource that must be stopped before the resource is stopped and a child resource that must be started before the resource is started. A first component of the resource group includes only resources that do not have an associated parent resource. A last component of the resource group includes only resources that do not have an associated child resource.

In other features, the data center management method includes storing one or more resource templates in the management data store, where each template of the one or more resource templates includes a set of control elements. The method further includes, in response to receiving, via the operator portal, a request to register a new resource via the operator portal: prompting an operator, via the operator portal, to select a first template of the one or more resource templates, prompting the operator, via the operator portal, to provide (i) a name of the new resource and (ii) a description of the new resource, and adding a new resource record to the set of resource records. The new resource record includes the name of the new resource, the description of the new resource, and the set of control elements of the first template.

In further features, each element of the set of control elements includes a label, a default value, an order value, and one or more associated tasks. In yet further features, the one or more associated tasks includes at least one of start, stop, and status.

In other features, stopping every resource in the resource group at the first data center includes, for each resource in the resource group, (i) generating a stop instruction based on the set of control elements associated with the resource and (ii) executing the stop instruction at the first data center. Starting every resource in the resource group at the second data center includes, for each resource in the resource group, (i) generating a start instruction based on the set of control elements associated with the resource and (ii) executing the start instruction at the second data center.

In yet other features, the data center management method includes, in response to receiving a group status request via the operator portal, obtaining a status of each resource in the resource group at the first data center and the second data center.

In other features, the data center management method includes, in response to receiving a request to stop a selected component, stopping each resource associated with the selected component at one of the first data center and the second data center independent of dependency data of each resource associated with the selected component.

In other features, the data center management method includes, in response to receiving a request to start a selected resource, starting the selected resource at one of the first data center and the second data center independent of dependency data of the selected resource.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 8 is an example user interfaces of a data center management system according to the principles of the present disclosure.

In the drawings, reference numbers may be reused to identify similar and/or identical elements.

DETAILED DESCRIPTION

Introduction

Figure 1:
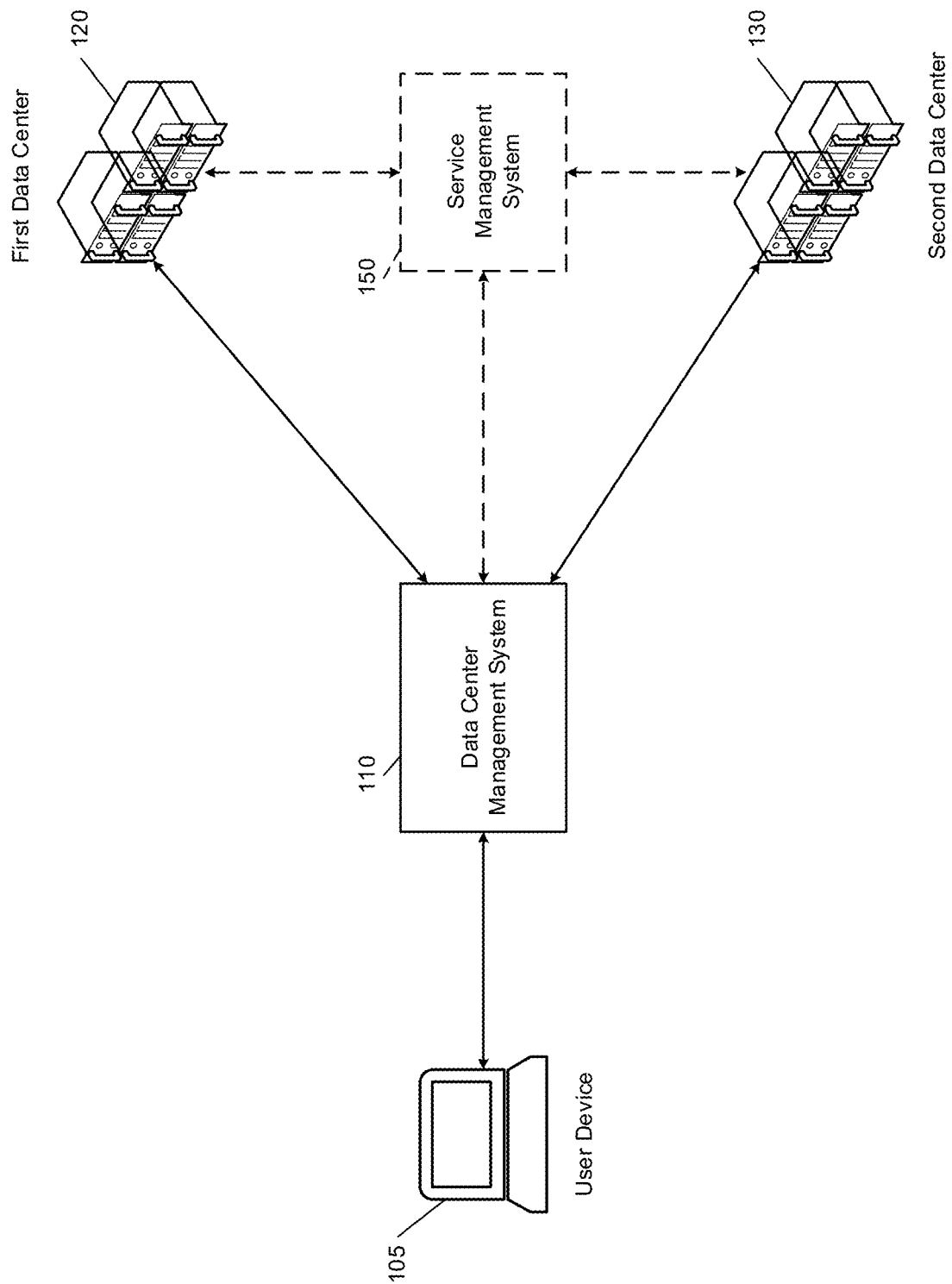
FIG. 1 is a functional block diagram of an example computing environment including a data center management system according to the principles of the present disclosure.

In FIG. 1, a user device 105 communicates with a data center management system 110. The data center management system 110 communicates with a first data center 120 and a second data center 130. The data center management system 110 controls resources hosted at the first data center 120 and the second data center 130. Resources may include, but are not limited to, applications, middleware, and databases. In some implementations, the first data center 120 and the second data center 130 host the same resources such that the second data center 130 may be used as a backup for the first data center 120 and vice versa.

The data center management system 110 provides centralized control of the resources located in the first data center 120 and the second data center 130. Using the user device 105, operators may start, stop, or obtain the status of each resource. To control the resources, the data center management system 110 remotely executes instructions for each resource. For example, the data center management system 110 may execute scripts that are stored locally for each resource.

The data center management system 110 may execute a control script by directly communicating with the first data center 120 or the second data center 130. In some implementations, the data center management system 110 may communicate with a service management system 150. The data center management system 110 may instruct the service management system 150 to execute a script associated with a resource in the first data center 120 or the second data center 130. For additional information regarding service management systems, see U.S. patent application Ser. No. 16/371,062, filed Mar. 31, 2019, titled "Centralized Automation System for Service Management," with first-named inventor Glenn Jared Komsky. The entire disclosure of this application is incorporated by reference.

Figure 2:
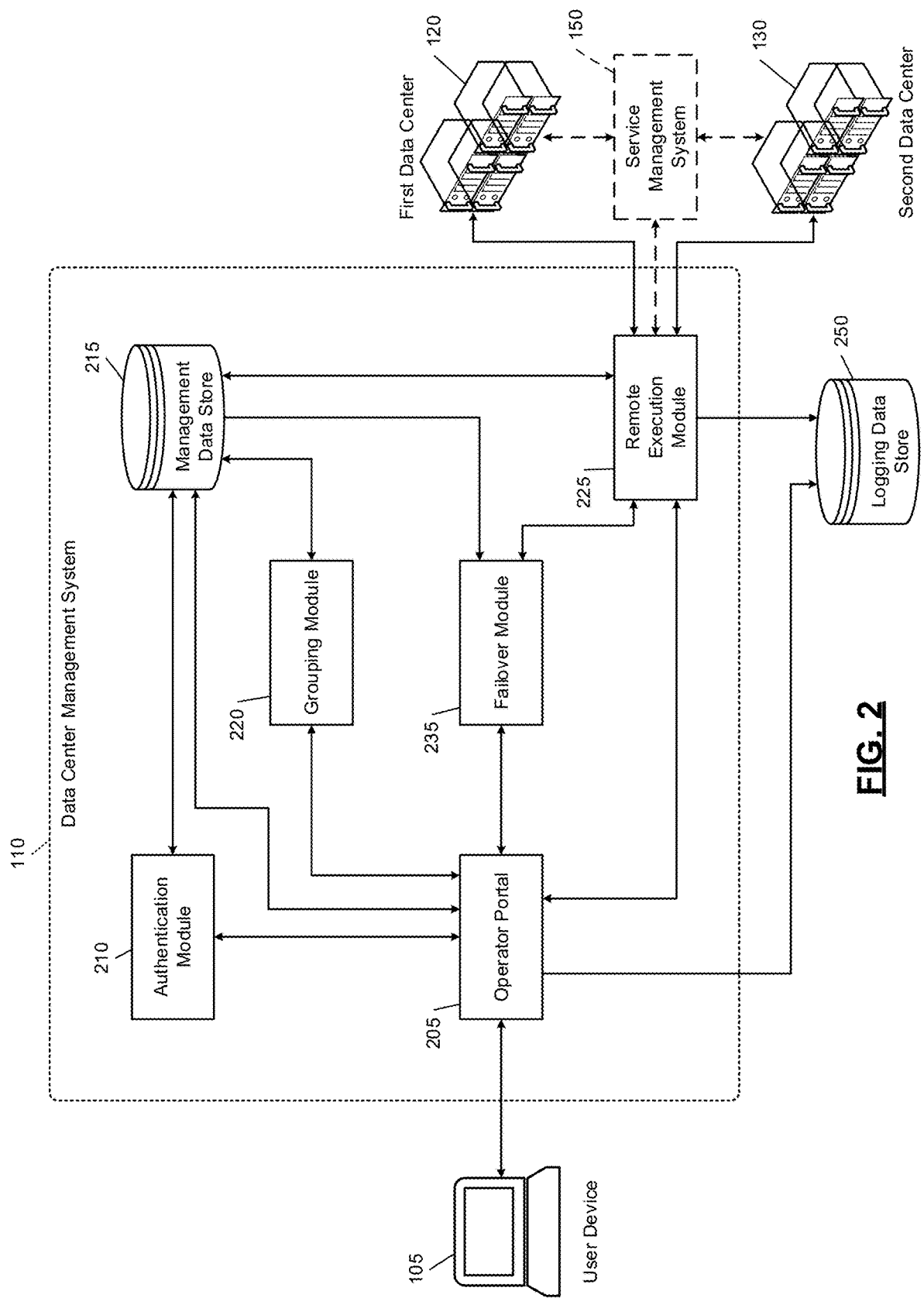
FIG. 2 is a functional block diagram of an example implementation of a data center management system according to the principles of the present disclosure.

In FIG. 2, a functional block diagram of an example implementation of the data center management system 110 includes an operator portal 205 and an authentication module 210. An operator may use the user device 105 to access the data center management system 110 via the operator portal 205. In some implementations, the operator portal 205 may be implemented as a web portal. The authentication module 210 receives credentials associated with the operator from the operator portal 205 and determines whether the operator is authorized to access the data center management system 110. In some implementations, the authentication module 210 compares the received credentials to information stored in a management data store 215. In other implementations, the authentication module 210 communicates with an active directory system (not shown) to determine if the operator is authorized. The authentication module 210 provides an authorization status of the operator to the operator portal 205.

The operator portal 205 presents a user interface (UI) to the operator based on the received authorization status. The authorization status may indicate that the operator is an operations administrator, a domain name system (DNS) administrator, a standard operator, or a manager. An operations administrator is permitted to create new resource templates, register data center resources, generate groupings of registered resources, and to create resource group management pages. A DNS administrator is permitted to create and edit host name mapping records. A standard operator is able use the resource group management pages to control registered resources in response to a manager unlocking a management page. The authorization status may also indicate that the operator is a super administrator. In addition to the capabilities of an operations administrator or a DNS administrator, a super administrator is permitted to add new operations administrators, DNS administrators, managers, or standard operators to the data center management system 110.

An operations administrator may use the operator portal 205 to create a new resource template for the data center management system 110. The operator portal 205 may prompt the operations administrator to enter information about the new resource template—for example, the name, a brief description, and the category type of the resource. The resource category type may be either local or global. A global resource is a resource that spans both the first data center 120 and the second data center 130. A DNS service is one example of a global resource. A local resource is a resource that has a separate instance in the first data center 120 and the second data center 130. Each instance of a local resource may be independently managed—for example, started or stopped.

The operations administrator may use the operator portal 205 to enter template elements related to the management of a resource. Each template element includes a label, a default value, a data center association, an order value, a read-only flag, a required flag, and a task association. The default value may be the location of a local script used to control the resource or attributes used to execute the script. Attributes may include the name and/or address of a host where the script is to be executed, a username that is to be used to execute the script, and any arguments for the script. The order value indicates the order in which the value of the elements should be combined to form an execution instruction for a particular task and data center—such as starting, stopping, or obtaining the status of a resource at a data center. The operator portal 205 stores the received information as a resource template in the management data store 215.

An operations administrator may use the operator portal 205 to register a resource with the data center management system 110. The operator portal 205 may display a list of resource templates stored in the management data store 215 and prompt the operations administrator to select a template associated with the resource to be registered. In response to the operations administrator selecting a resource template, the operator portal 205 displays a new resource UI based on the selected resource template. The new resource UI includes the default value of every element in the selected resource template. The operator portal 205 prompts the operations administrator to provide a name and description for the new resource. The operations administrator may change the default value of any element that is not marked as read-only. The operator portal 205 stores the name, description, and value for each element as a resource record in the management data store 215.

The operations administrator may also use the operator portal 205 to set the dependencies of a selected resource. The operator portal 205 prompts the operations administrator to indicate the registered resources that are parent resources of the selected resource and the registered resources that are child resources of the selected resource. A parent resource is a resource that must be stopped in a data center before the selected resource is stopped in the same data center. A child resource is a resource that must be started in a data center before the selected resource is started in the same data center. The operator portal 205 stores the indicated dependencies for the selected resource by storing the dependencies in the resource record that corresponds to the selected resource in the management data store 215. In some implementations, the operator portal 205 also updates the resource records of the indicated parent and child resources in the management data store 215 to include their respective dependencies with respect to the selected resource.

The operations administrator may use the operator portal 205 to associate one or more meta tags with a selected resource. Meta tags may be used to create logical groups of registered resources—for example, related databases or multiple resources that are used to perform a single function. The operator portal 205 updates the resource record of the selected resource in the management data store 215 to include the one or more meta tags.

The operation administrator may use the operator portal 205 to create a resource group and then generate a management page for the resource group. The operations administrator may create a high availability (HA) resource group, a disaster recover (DR) resource group, or a custom resource group. An HA group includes resources in both the first data center 120 and the second data center 130. A DR group is a collection of resources that are located in a single data center for example, either the first data center 120 or the second data center 130. A custom group includes only a single resource type where the resource may be in one of three or more states.

In response to receiving a request to create a resource group, the operator portal 205 prompts the operations administrator to provide information about the resource group including the type of the resource group—such as HA, DR, or custom. In some implementations, the information about the resource group may include a name, an owner, and/or a description of the resource group. The operator portal then prompts the operations administrator to select one or more registered resources. The operator portal may display a list of registered resources and prompt the operations administrator to select the resources from the list. In addition, the operations administrator may provide a meta tag and the operator portal 205 selects all of the registered resources that include the provided meta tag.

The operator portal 205 provides the list of selected resources to a grouping module 220. For each resource in the list, the grouping module 220 determines which registered resources have a dependency on the resource and adds the determined registered resources to the list based on the resource records stored in the management data store 215. For each resource added to the list, the grouping module 220 determines which registered resources have a dependency on the added resource and adds the determined resources to the list.

Once all of the dependencies have been determined and the associated resources have been added to the list, the grouping module 220 organizes the listed resources into one or more ordered components. The grouping module 220 places the resources in the list that do not have a parent resource into a first component. If the list includes resources that are not included in the first component, the grouping module places the resources in the list that are child resources of the resources in the first component into a second component. If the list includes resources that are not included in either the first component or the second component, the grouping module places the resources in the list that are child resources of the resources in the second component into a third component. The grouping module 220 continues to place the listed resources into new components in this manner until each listed resource is included in a component. The last component will only include resources that do not have a child resource.

The grouping module 220 provides the generated list and determined components to the operator portal 205 for display to the operations administrator. The operator portal 205 displays the list of resources from the grouping module 220 organized by component. The operations administrator may use the operator portal 205 to generate a management page for the resource group. The operator portal 205 stores the generated page in the management data store 215.

A DNS administrator may use the operator portal 205 to create a DNS mapping for the first data center 120 and the second data center 130. The operator portal 205 may prompt the DNS administrator to enter host name mappings—for example, A-records, CNames, and IP pools—that include primary and secondary mappings for the first data center 120 and the second data center 130. The DNS administrator may identify each host name mapping as an internal mapping, an external mapping, or as both an internal and external mapping. Each host name mapping may also be associated with an application (resource) or a resource group. The operator portal 205 stores the received host name mappings as a DNS mapping record in the management data store 215. The DNS administrator may also use the operator portal 205 to generate a DNS management page for the resources associated with the DNS mapping record. The operator portal 205 stores the generated DNS management page in the management data store 215.

A remote execution module 225 communicates with the first data center 120 and the second data center 130 to locally execute scripts on the first data center 120 and the second data center 130. To execute a script for a resource, the remote execution module 225 may receive an execution request that includes a resource, a task, and a data center where the task is to be performed. In response to receiving the execution request, the remote execution module 225 obtains the corresponding resource record from the management data store 215. The remote execution module 225 determines the elements in the resource record associated with both the task and the data center included in the execution request and uses the values of the determined elements to generate an execution instruction. For example, the remote execution module 225 may combine the values of the determined elements based on the order value of each element to generate the execution instruction. The remote execution module 225 uses the generated execution instruction to execute a script on the first data center 120 or the second data center 130. In response to receiving an execution request for a DNS resource, the remote execution module 225 obtains both the corresponding resource record and the DNS mapping record associated with the resource from the management data store 215. The remote execution module 225 uses both the resource record and the DNS mapping record to generate the execution instruction.

The remote execution module 225 may process received requests sequentially or in parallel. For example, in response to the operator portal providing the remote execution module 225 with a set of execution requests to stop all resources in a component, the remote execution module 225 may execute the stop script for each resource sequentially or may simultaneously execute the stop script for two or more resources.

After execution of a script, the resource returns the result of the execution to the remote execution module 225. The remote execution module 225 may store the received result in the management data store 215. The remote execution module 225 may also provide the results to the operator portal 205, which may visually present the results to the operator.

In some implementations, the remote execution module 225 may use the service management system 150 to execute a script for a resource. In response to the generated execution instructions including instructions for the service management system 150 the remote execution module 225 instructs the service management system 150 to execute the identified script on the first data center 120 or the second data center 130. The service management system 150 returns the result of the execution to the remote execution module 225.

A standard operator may use the operator portal 205 to start, stop, or obtain the status of one or more registered resources. For example, the standard operator may use an HA resource group management page to stop all resources in an HA resource group at the first data center 120 and start all of the resources in the resource group at the second data center 130 to perform a failover from the first data center 120 to the second data center 130. The standard operator may use a DR resource group management page to stop or start all of the resources in a DR resource group at a single data center—for example, the first data center 120 or the second data center 130.

To execute a failover to the second data center 130, the operator portal 205 provides a failover module 235 with the data center to perform the failover to and a list of the components and associated resources in the resource group. In response to receiving a request to failover to the second data center 130, the failover module 235 instructs the remote execution module 225 to stop all of the resources in the first component at the first data center 120. Once all of the resources in the first component at the first data center have stopped, if the resource group has a second component, the failover module 235 instructs the remote execution module to stop every resource in the second component at the first data center 120. The failover module 235 continues to stop the resources in each component in the resource group sequentially until all of the resources in the resource group at the first data center 120 are stopped. The failover module 235 then starts the resources in the resource group at the second data center 130. The failover module 235 begins by starting the resources in the highest numbered component—in other words, the resources in the resource group that do not have child resources—at the second data center 130. The failover module 235 continues to start the resources in each component sequentially at the second data center 130 until all of the resources in the resource group are started at the second data center 130.

The operator may also use the HA resource group management page to start, stop, or obtain the status of a single resource or all resources in a component of an HA resource group at a single data center. The operator portal 205 instructs the remote execution module 225 to start, stop, or obtain the status of the selected resources. The operator portal 205 does not take into account the dependencies of the selected resources when instructing the remote execution module 225 to execute the appropriate script on the selected resources. In various implementations, a manager must sign in to the HA resource group management page before the standard operator can use the page to start, stop, or obtain the status of the registered resources or perform a failover.

The standard operator may use a DR resource group management page to stop or start all of the resources in a DR resource group at a single data center—for example, the first data center 120 or the second data center 130. To stop or start all of the resources at the first data center 120 in a DR resource group, the operator portal 205 provides the failover module 235 with the data center associated with the DR resource group, a list of the components and associated resources in the DR resource group, and the requested task. In response to receiving a request to stop all of the resources in a DR resource group, the failover module 235 instructs the remote execution module 225 to stop all of the resources in the first component at the data center. Once all of the resources in the first component have stopped, if the resource group has a second component, the failover module 235 instructs the remote execution module to stop every resource in the second component at the data center. The failover module 235 continues to stop the resources in each component in the resource group sequentially until all of the resources in the resource group at the data center are stopped.

The operator may also use the DR resource group management page to start, stop, or obtain the status of a single resource or all resources in a component of a DR resource group. The operator portal 205 instructs the remote execution module to start, stop, or obtain the status of the selected resources. The operator portal 205 does not take into account the dependencies of the selected resources when instructing the remote execution module 225 to execute the appropriate script on the selected resources. In various implementations, a manager must sign in to the DR resource group management page before the standard operator can use the page to start, stop, or obtain the status of the registered resources.

The remote execution module 225 stores each execution request and the associated results returned by the resource. In some implementations, the remote execution module 225 may store each request in a logging data store 250. In various implementations, the logging data store 250 may be independent of the data center management system 110. In other implementations, the data center management module 110 may include the logging data store 250. In various other implementations, the remote execution module 225 may provide the execution requests to a remote logging service (not shown) for storage. As an example only, the remote execution module 225 may transmit the execution requests to a Splunk logging service.

The operator portal 205 may store information associated with each operator that accesses the data center management system 110 and manager sign in to a management page. In some implementations, the operator portal may store the information in the logging data store 250. In other implementations, the operator portal 205 may provide the information to a remote logging service (not shown).

Example User Interfaces

Figure 3:
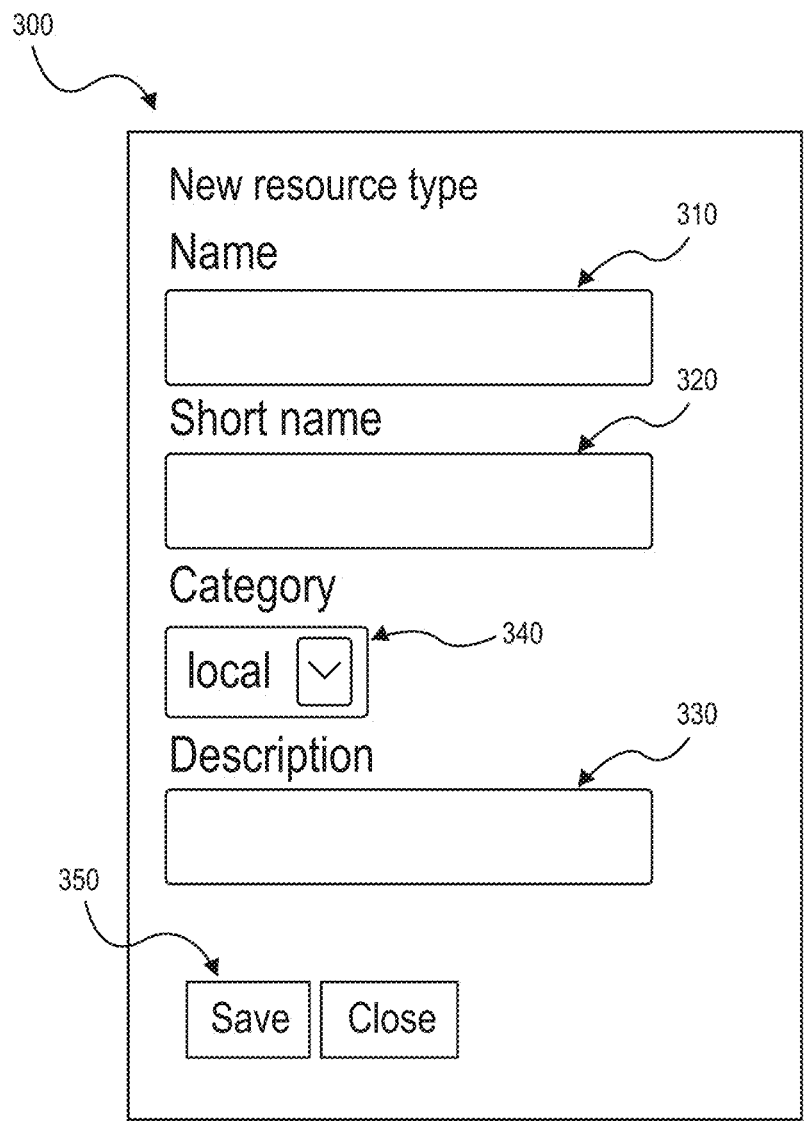
FIG. 3 is an example user interfaces of a data center management system according to the principles of the present disclosure.

FIGS. 3-9 are example user interfaces (UIs) that may be presented by the operator portal 205 to an authorized operator. In FIG. 3, a new resource template UI 300 allows an operations administrator to create a new resource template. The operator portal 205 may present the new resource template UI 300 in response to the operations administrator requesting to create a new resource template. The new resource template UI 300 prompts the operations administrator to enter a name 310, a short name 320, and a description 330 for the resource template. The new resource template UI 300 also prompts the operation administrator to select a resource category 340 associated with the new resource template—for example, local or global. Selection of a save button 350 results in the operator portal 205 adding a resource template that includes the provided information to the management data store 215.

Figure 4:
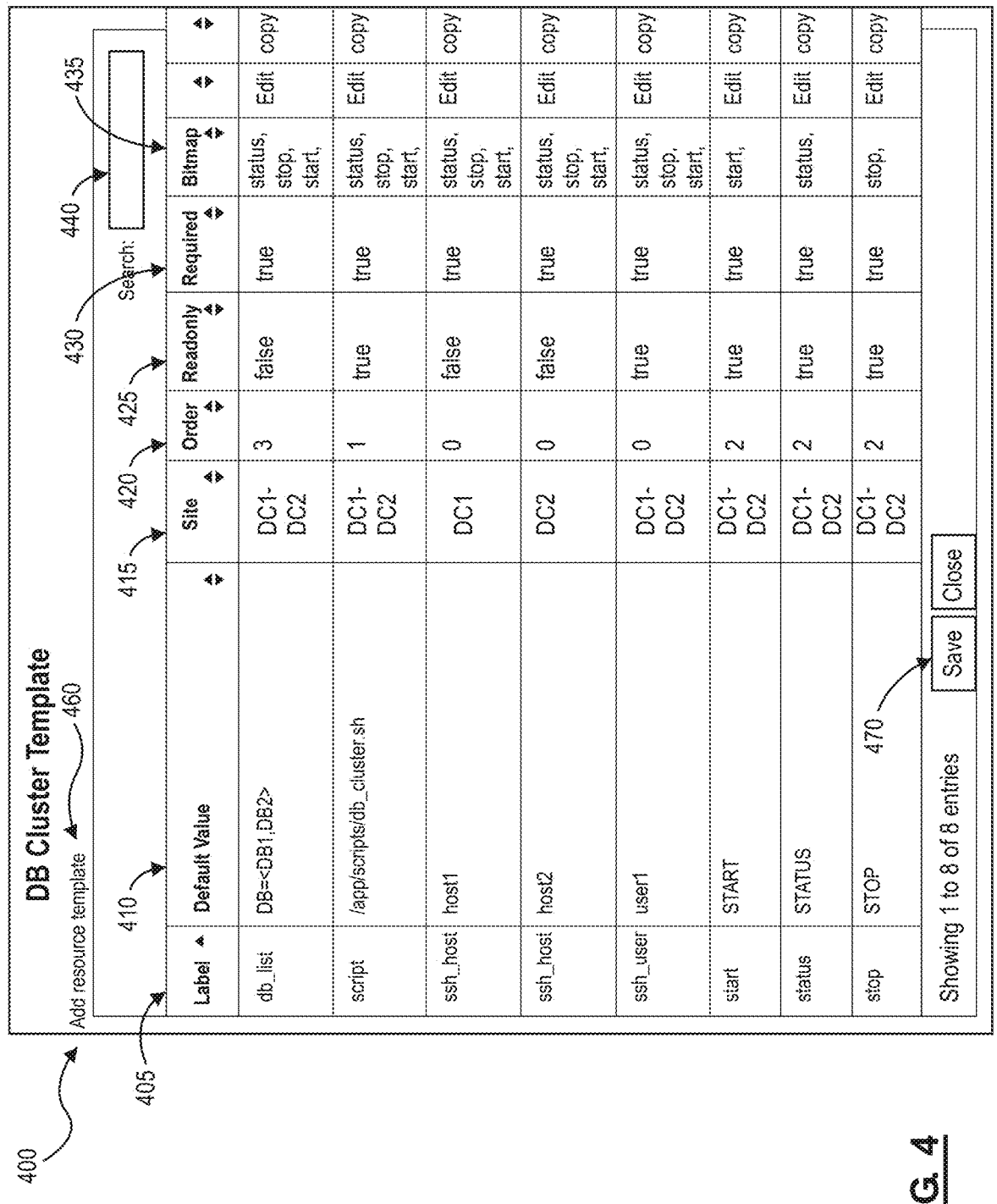
FIG. 4 is an example user interfaces of a data center management system according to the principles of the present disclosure.

In FIG. 4, a resource template UI 400 displays template elements associated with a "DB Cluster Template." Each row of the resource template UI 400 represents a separate element of the resource template. Each column of the resource template UI 400 displays an attribute of the element. For each displayed element, the resource template UI 400 displays a label 405, a default value 410, a site 415, an order value 420, a read-only flag value 425, and a required flag value 430 of the element. In addition, the resource template UI 400 also displays a bitmap 435 for each element. The site 415 indicates which data center the element applies to—for example, the first data center 120 (DC1), the second data center 130 (DC2), or both the first data center 120 and the second data center 130 (DC1-DC2). The bitmap 445 indicates which task(s)—such as start, stop, and status—the element applies to.

The operations manager may enter a text string into a search box 440 to search for the text string in the elements of the resource template. The operations administrator may select an "add resource template" link 460 to add a new element to the resource template. Selection of a save button 470 results in the operator portal 205 updating the resource template stored in the management data store 215 to include any changes made in the resource template UI 400.

The resource template UI 400 of FIG. 4 is associated with a database cluster and is one example of a resource template UI that may be generated and displayed by the operator portal 205. The operator portal 205 may generate and display a different resource template UI for each resource type—such as cluster managers, network file system (NFS) mounts, online/offline file systems, mount points, storage discs, DNS databases, and other types of databases—managed by the data center management system 110.

Figure 5:
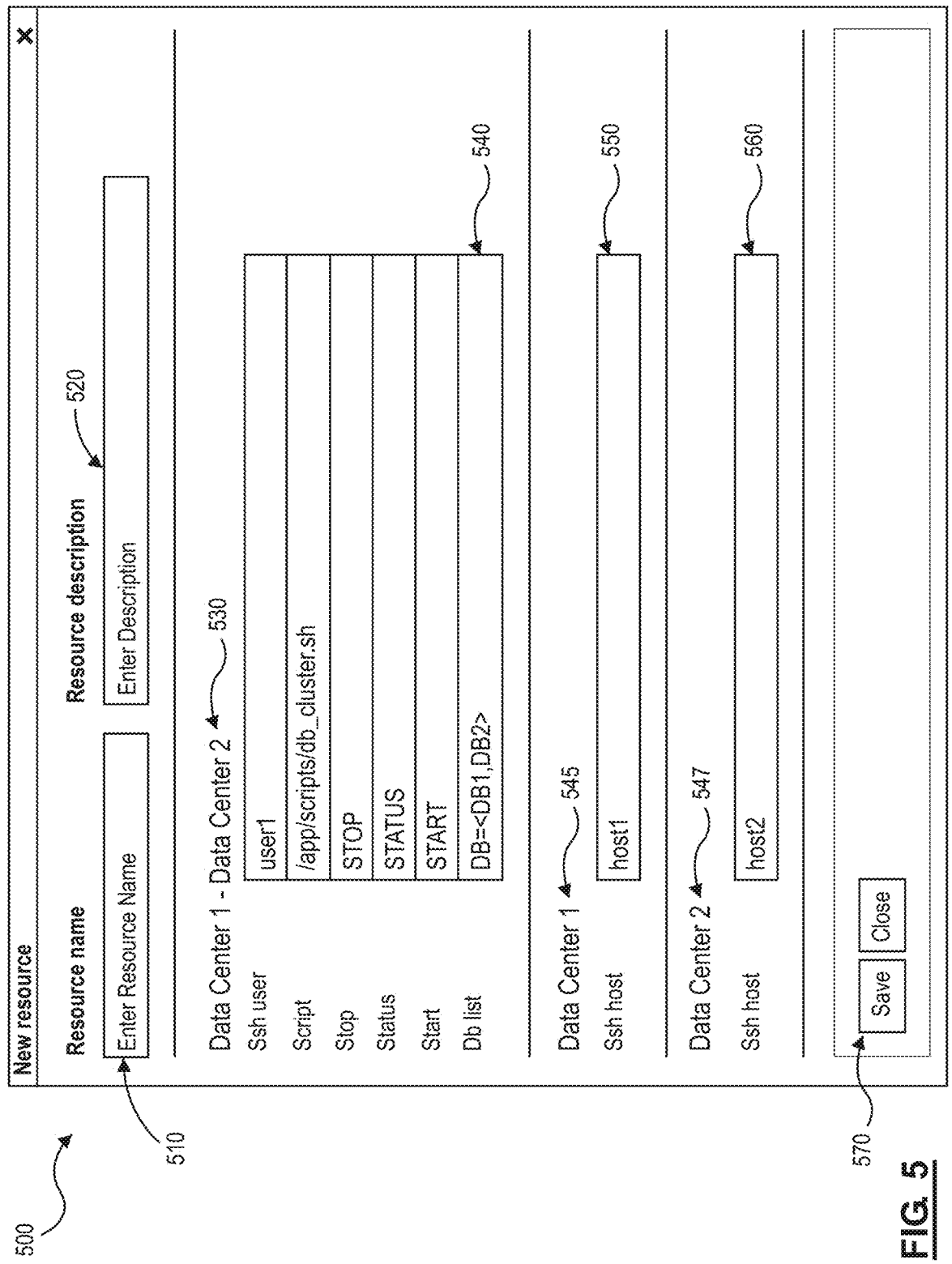
FIG. 5 is an example user interfaces of a data center management system according to the principles of the present disclosure.

In FIG. 5, a new resource UI 500 allows an operations administrator to create a new resource record based on the "DB Cluster Template." The new resource UI 500 prompts the operations administrator to enter a name 510 and description 520 for the new resource. The new resource UI 500 displays the labels and values for each element in the "DC Cluster Template." The elements that apply to both the first data center 120 and the second data center 130 are displayed at 530, the elements that only apply to the first data center 120 are displayed at 545, and the elements that only apply to the second data center are displayed at 547. Since the read-only flag for the elements labeled "Db list" and "Ssh host" are false, the operations administrator may change the values for these elements by entering new values in the text entry boxes 540, 550, and 560. Selection of a save button 570 results in the operator portal 205 adding a new resource record that includes the values displayed in the new resource UI 500 to the management data store 215.

Figure 6:
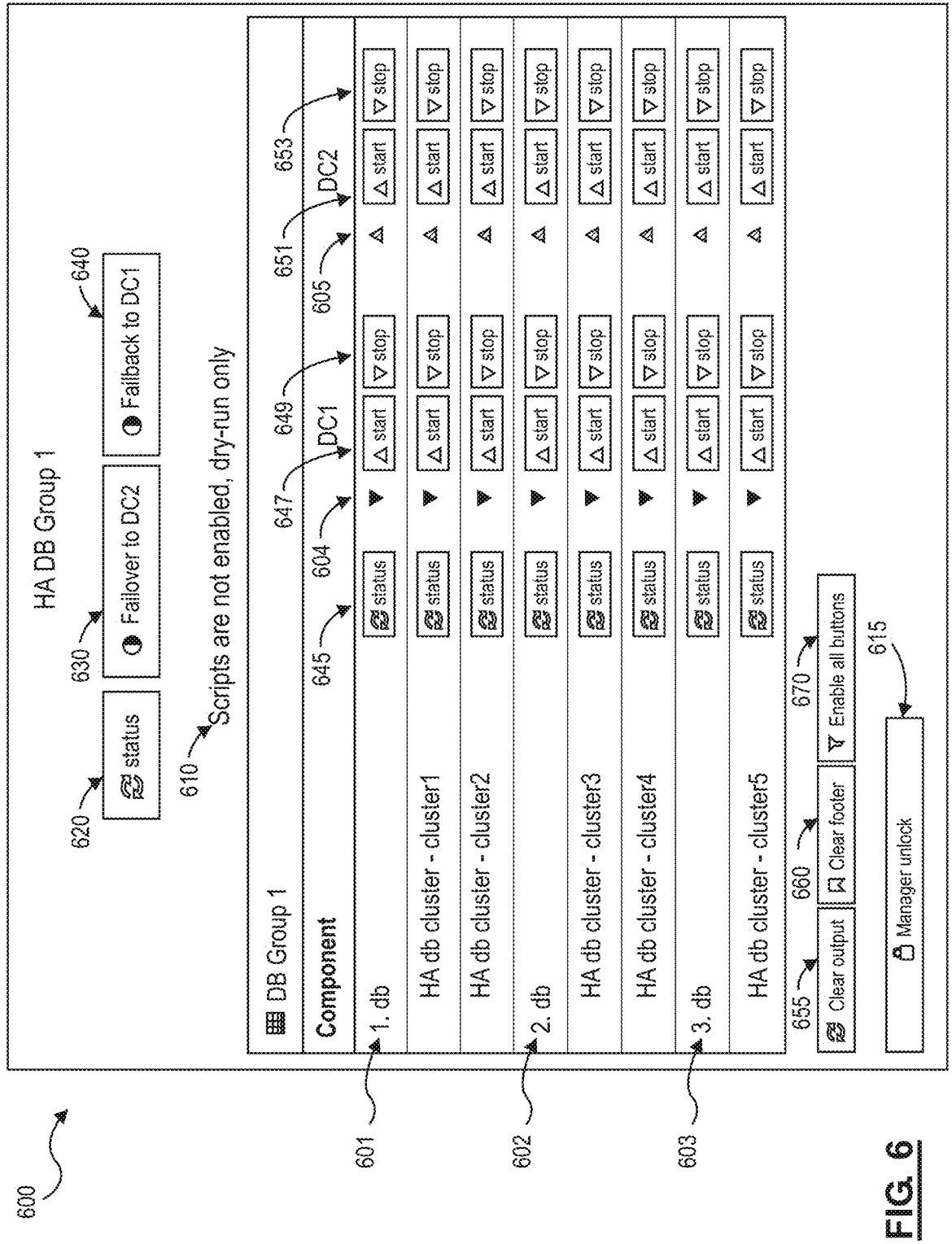
FIG. 6 is an example user interfaces of a data center management system according to the principles of the present disclosure.

In FIG. 6, a HA resource group management page UI 600 allows an operator to control the resources in "HA DB Group 1." The HA resource group management page UI 600 displays the three components and associated resources in "HA DB Group 1." The first component and its associated resources are displayed at 601, the second component and its associated resources are displayed at 602, and the third component and the associated resource is displayed at 603. The HA resource group management page UI 600 also displays the last obtained status for each listed component and resource. For example, a first status 604 shows the status at the first data center 120 and a second status 605 shows the status at the second data center 130. With respect to each listed resource, an upwards pointing triangle indicates that the resource is started and a downwards facing triangle indicates that the resource is stopped. With respect to each listed component, an upwards pointing triangle indicates that every resource included in the component is started and a downwards facing triangle indicates that every resource included in the component is down. The operator portal 205 may display a "?" when that status of a resource is unknown or when a component includes a mix of started and stopped resources at a data center.

As indicated by the text "Scripts are not enabled, dry-run only" at 610, the buttons on the management page are not enabled. Selection of the manager unlock button 615 results in the operator portal 205 prompting a manager to provide a username and password to enable the control buttons in the HA resource group management page UI 600. Once the operator portal 205 verifies the manager's credentials, the operator portal 205 updates the text displayed at 610 to indicate that buttons are active and the operator may use the buttons to control the resources in "HA DB Group 1."

Selection of a group status button 620 results in the operator portal 205 obtaining the current status of every resource in the resource group at both the first data center 120 and the second data center 130. The HA resource group management page UI 600 includes a "Failover to DC2" button 630 and a "Failback to DC1" button 640. Selection of the of the "Failover to DC2" button 630 results in a failover of the resources in the resource group from the first data center 120 to the second data center 130. Selection of the "Failback to DC1" button 640 results in a failover of the resources in the resource group from the second data center 130 to the first data center 120.

For each listed component and resource, the HA resource group management page UI 600 includes a status button 645, a first data center start button 647, a first data center stop button 649, a second data center start button 651, and a second data center stop button 653. Selection of the status button 645 will result in the operator portal 205 obtaining the status for the corresponding component or resource at both the first data center 120 and the second data center 130. Selection of the first data center start button 647 or the first data center stop button 649 will result in the corresponding component or resource being started or stopped only at the first data center 120, respectively. Selection of the second data center start button 651 or the second data center stop button 653 will result in the corresponding component or resource being started or stopped only at the second data center 130, respectively.

In some implementations, execution results received by the operator portal 205 from the remote execution module 225 may be displayed in an output window (not shown) positioned next to the HA resource group management page UI 600. Selection of a "Clear output" button 655 results in the clearing of the execution results displayed in the output window. In various implementations, selection of a listed resource results in the display of all possible execution instructions associated with the selected resource. The possible execution instructions are displayed in an instruction window (not shown) positioned below the HA resource group management page UI 600. Selection of a "Clear footer" button 660 results in the clearing of the execution instructions displayed in the instruction window.

In some implementations, the first data center start button 647, the first data center stop button 649, the second data center start button 651, and the second data center stop button 653 may be disabled and grayed out for a displayed component or resource based on the last obtained statuses of the resources in the resource group. For example, in response to a status of a component or resource being started or up, the first data center start button 647 and/or the second data center start button 651 that corresponds to the component or resource may be disabled and grayed out by the operator portal 205. Similarly, in response to a status of a component or resource being stopped or down, the first data center stop button 649 and the second data center stop button 653 may be disabled and grayed out by the operator portal 205. Selection of an "Enable all buttons" button 670 results in the operator portal enabling the first data center start button 647, the first data center stop button 649, the second data center start button 651, and the second data center stop button 653 for every resource and component in the resource group regardless of the statuses of the resources.

The HA resource group management page UI 600 is one example of an HA resource group management page that may be generated and displayed by the operator portal 205. Although the HA resource group associated with the HA resource group management page UI 600 only includes database clusters, the data center management system 110 may be used to generate HA resource groups that includes one or more other types of resources—such as cluster managers, network file system (NFS) mounts, online/offline file systems, mount points, storage discs, DNS databases, and other types of databases—in addition to or in place of database clusters.

Figure 7:
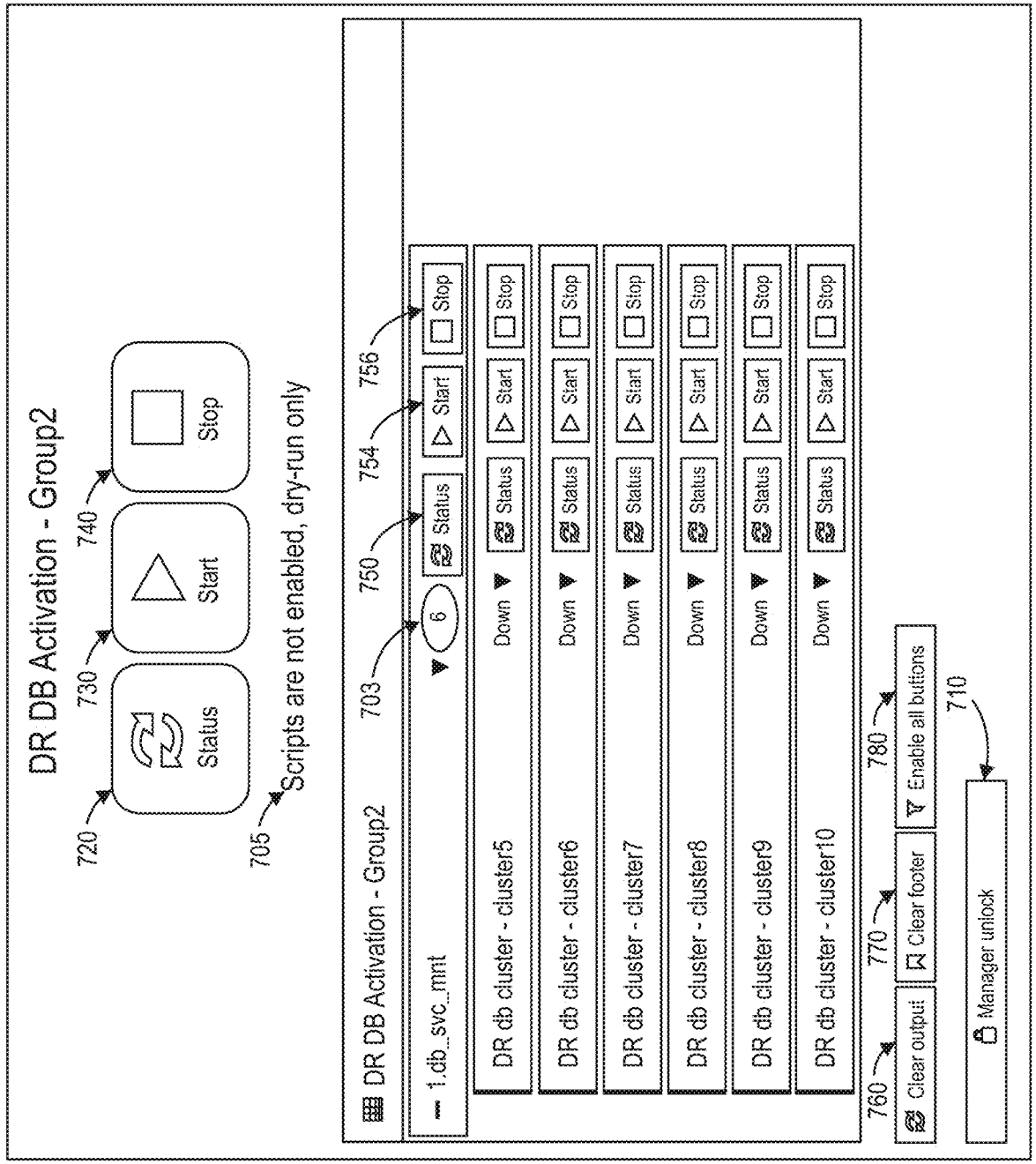
FIG. 7 is an example user interfaces of a data center management system according to the principles of the present disclosure.

In FIG. 7, a DR resource group management page UI 700 allows an operator to control the resources in "DR DB Activation—Group2." The DR resource group management page UI 700 displays the component and associated resources in DR DB Activation—Group2," The first, and only, component in the resource group and its associated resources are displayed at 701. The DR resource group management page UI 700 also displays the last obtained status 703 for each listed component and resource. With respect to each listed resource, an upwards pointing triangle indicates that the resource is started and a downwards pointing triangle indicates that the resource is stopped. With respect to the listed component, an upwards pointing triangle indicates that every resource included in the component is started and a downwards facing triangle indicates that every resource included in the component is down. The operator portal 205 may display a "?" when the status of a resource is unknown or when the component includes a mix of started and stopped resources.

As indicated by the text "Scripts are not enabled, dry-run only" at 705, the buttons on the management page are not enabled. Selection of a manager unlock button 710 results in the operator portal 205 prompting a manager to provide a username and password to enable the control buttons in the DR resource group management page UI 700. Once the operator portal 205 verifies the manager's credentials, the operator portal 205 updates the text displayed at 705 to indicate that buttons are active and the operator may use the buttons to control the resources in "DR DB Activation—Group2."

Selection of a group status button 720 results in the operator portal 205 obtaining the current status of every resource in the resource group at the data center associated with the resource group. The DR resource group management page UI 700 includes a group start button 730 and a group stop button 740. Selection of the of the group start button 730 results in the operator portal 205 instructing the failover module 235 to start all of the resources in the resource group. Selection of the group stop button 740 results in the operator portal 205 instructing the failover module 235 to stop all of the resources in the resource group.

For each listed component and resource, the DR resource group management page UI 700 includes a status button 750, a start button 754, and a stop button 756. Selection of the status button 750 will result in the operator portal 205 obtaining the status for the corresponding component or resource. Selection of the start button 754 or the stop button 756 will result in the corresponding component or resource being started or stopped.

In some implementations, execution results received by the operator portal 205 from the remote execution module 225 may be displayed in an output window (not shown) positioned next to the DR resource group management page UI 700. Selection of a "Clear output" button 760 results in the clearing of the execution results displayed in the output window. In various implementations, selection of a listed resource results in the display of all of the possible execution instructions associated with the selected resource. The execution instructions are displayed in an instruction window (not shown) positioned below the DR resource group management page UI 700. Selection of a "Clear footer" button 770 results in the clearing of the execution instructions displayed in the instruction window.

In some implementations, the start button 754 or the stop button 756 may be disabled and grayed out for a displayed component or resource based on the last obtained status of the resources in the resource group. Selection of an "Enable all buttons" button 780 results in the operator portal enabling the start button 754 or the stop button 756 for every resource and component in the resource group regardless of the statuses of the resources.

The DR resource group management page UI 700 is one example of a DR resource group management page that may be generated and displayed by the operator portal 205. Although the DR resource group associated with the DR resource group management page UI 700 only includes database clusters, the data center management system 110 may be used to generate DR resource groups that includes one or more other types of resources—such as cluster managers, network file system (NFS) mounts, online/offline file systems, mount points, storage discs, DNS databases, and other types of databases—in addition to or in place of database clusters.

In FIG. 8, a DNS mapping record UI 800 displays a list of the host name mappings that are stored in the management data store 215. Each row of the DNS mapping record UI 800 represents a host name mapping that is included in the DNS mapping record. Each column of the DNS mapping record UI 800 displays an attribute of the host name mapping. For each listed host name mapping, the DNS mapping record UI 800 displays a type 810, a url 820, a primary host IP address/alias 830, a primary host location (REC1_LOC) 840, a secondary host IP address/alias 850, a secondary host location 860, a DNS type 870, a group 880 associated with the mapping, and applications 890 associated with the mapping.

Figure 9:
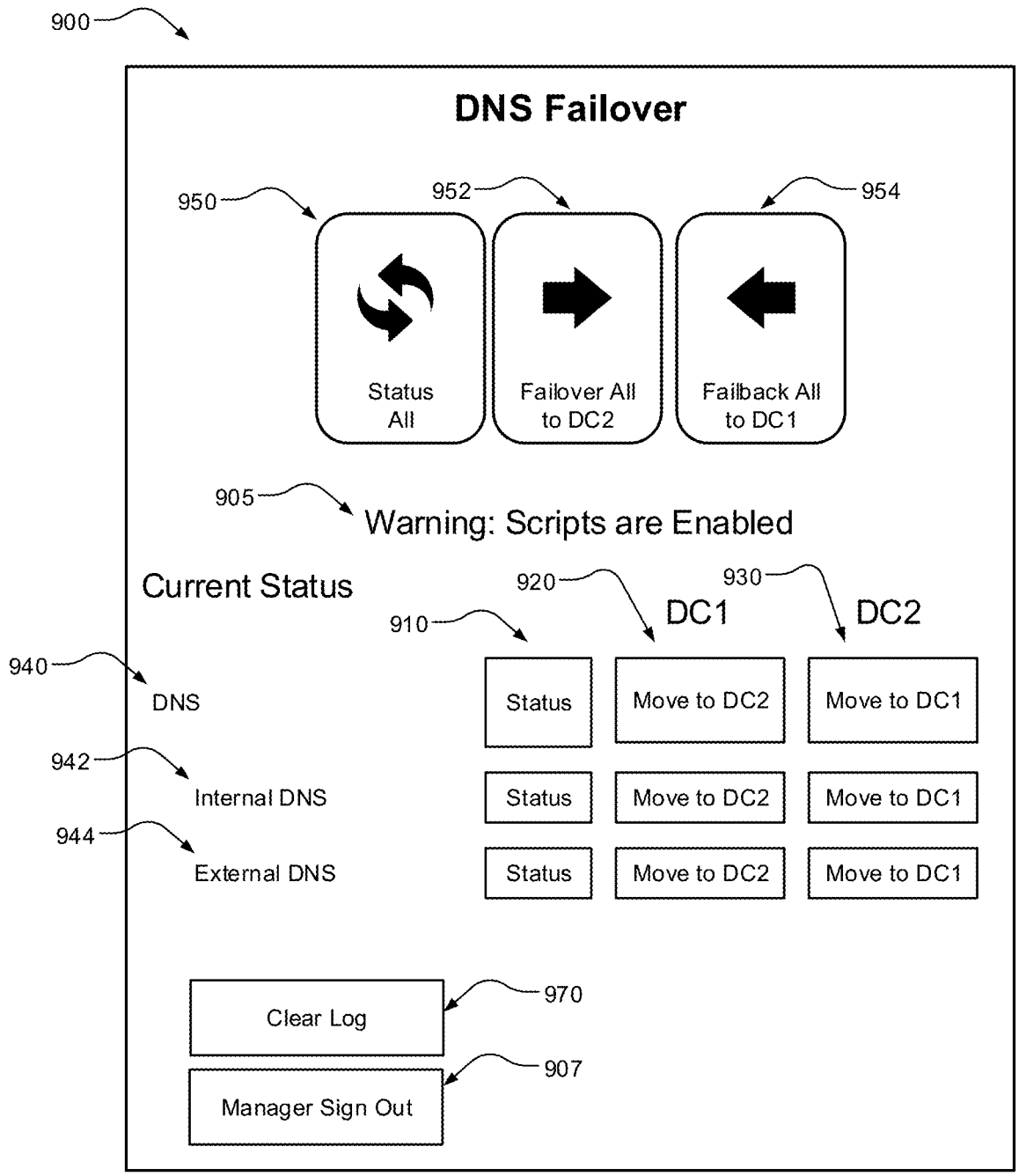
FIG. 9 is an example user interfaces of a data center management system according to the principles of the present disclosure.

In FIG. 9, a DNS management page UI 900 allows an operator to manage the host name mapping for the first data center 120 and the second data center 130. For example, the operator may select either the primary host mapping data or the secondary host mapping data in the DNS mapping record for the first data center 120 and the second data center 130. As indicated by the text "Warning: Scripts are Enabled" at 905, the buttons on the DNS management page UI 900 are enabled. Selection of a "Manager Sign Out" button 907 results in the operator portal 205 disabling the buttons and updating the text displayed at 905 to indicate that buttons are not active.

The DNS management page UI 900 includes a status button 910, a "Move to DC2" button 920, and a "Move to DC1" button 930 for an overall DNS mapping 940, an internal DNS mapping 942, and an external DNS mapping 944 for the first data center 120 and the second data center 130. The DNS management page UI 900 also includes a "Status All" button 950, a "Failover All to DC2" button 952, and a "Failback All to DC1" button 954. Selection of the "Status All" button 950 or the status button 910 that corresponds to the overall DNS mapping 940 results in the operator portal 205 obtaining the host mapping currently being implemented by the first data center 120 and the second data center 130—for example, the primary or secondary host mapping—for both the internal DNS mapping 942 and the external DNS mapping 944 for the first data center 120 and the second data center 130. Selection of the status button 910 that corresponds to the internal DNS mapping 942 or the external DNS mapping 944 results in the operator portal 205 obtaining the host mapping current being implemented for the internal DNS mapping 942 or the external DNS mapping 944, respectively.

The operator portal 205 may change the color and/or outline of the status button 910, the "Move to DC2" button 920, and the "Move to DC1" button 930 for the overall DNS mapping 940, the internal DNS mapping 942, and the external DNS mapping 944 based on the determined current host mapping. For example, in response to determining that the primary host mapping is being used for the internal DNS mapping 942 or the external DNS mapping 944, the operator portal 205 may display a green outline around the corresponding "Move to DC2" button 920 and a red outline around the corresponding "Move to DC1" button 930. Similarly, in response to the determining that the secondary host mapping is being used for the internal DNS mapping 942 or the external DNS mapping 944, the operator portal 205 may display a red outline around the corresponding "Move to DC2" button 920 and a green outline around the corresponding "Move to DC1" button 930.

When the status of both the internal DNS mapping and the external DNS mapping indicates that the primary mapping is currently being used, the operator portal 205 displays a green outline around the "Move to DC2" button 920 and a red outline around the "Move to DC1" button 930 that corresponds to the overall DNS mapping 940. The operator portal may display a yellow outline around the Move to DC2" button 920 the "Move to DC1" button 930 that corresponds to the overall DNS mapping 940 in response to determining that the internal DNS mapping 942 and the external DNS mapping 944 are currently using different DNS mappings.

Selection of the "Failover All to DC2" button 952 or the "Move to DC2" button 920 that corresponds to the overall DNS mapping 940 results in the operator portal 205 instructing the remote execution module 225 to set both the internal DNS mapping 942 and the external DNS mapping 944 to the secondary mapping. Conversely, selection of the "Failback All to DC1" button 954 or the "Move to DC1" button 930 that corresponds to the overall DNS mapping 940 results in the operator portal 205 instructing the remote execution module 225 to set both the internal DNS mapping 942 and the external DNS mapping 944 to the primary mapping. Selection of the "Move to DC2" button 920 that corresponds to the internal DNS mapping 942 or the external DNS mapping 944 results in the operator portal 205 instructing the remote execution module 225 to use the secondary DNS mapping for the internal DNS mapping 942 or the external DNS mapping 944, respectively. Selection of the "Move to DC1" button 920 that corresponds the internal DNS mapping 942 or the external DNS mapping 944 results in the operator portal 205 instructing the remote execution module 225 to use the primary DNS mapping for the internal DNS mapping 942 or the external DNS mapping 944, respectively.

In some implementations, the execution instructions generated by the remote execution module 225 and/or the execution results received by the operator portal 205 from the remote execution module 225 related to the host mapping of the first data center 120 and the second data center 130 may be displayed in a log window (not shown). In various implementations, the log window may be positioned next to the DNS management page UI 900. Selection of a "Clear Log" button 970 results in the clearing of the execution results displayed in the log window.

Flowchart

Figure 10A:
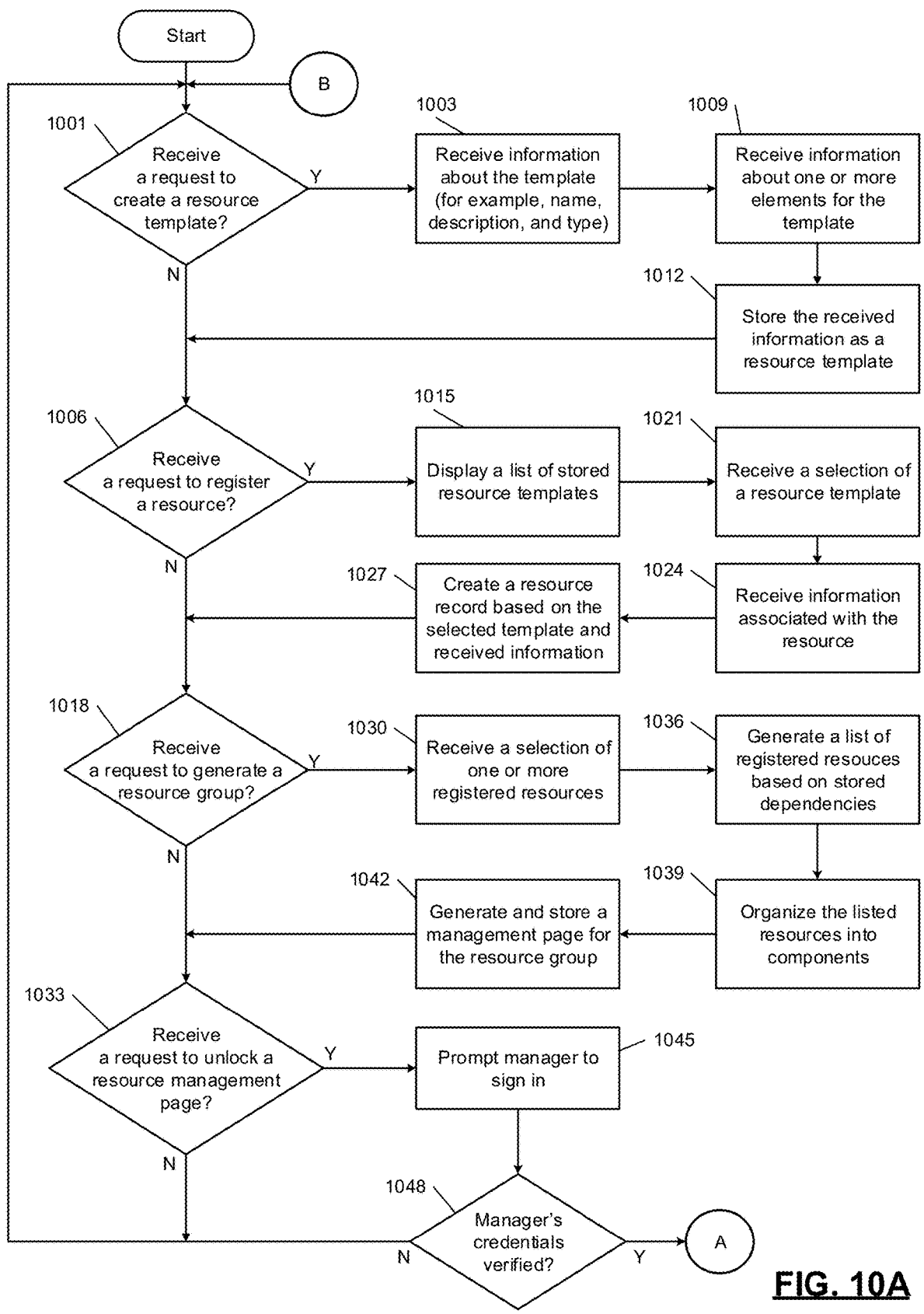
FIGS. 10A and 10B together form a flowchart of example operation performed by an implementation of the data center management system.
Figure 10B:
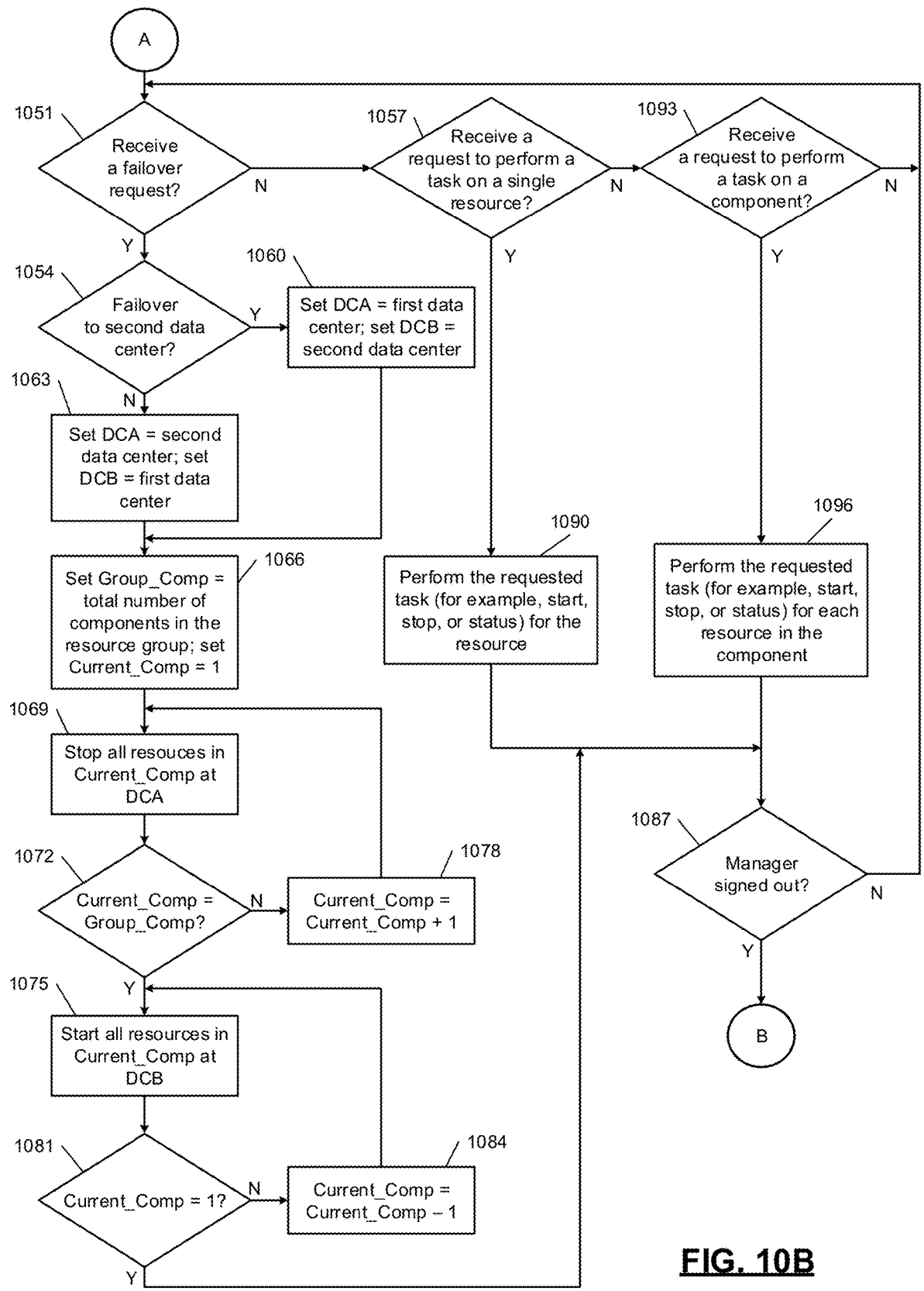

FIGS. 10A and 10B are a flowchart that describes registration and control of resources by the data center management system. Control begins at 1001 of FIG. 10A upon start of the data center management system 110. At 1001, control determines whether an operator has requested to create a new resource template. For example, the data center management system 110 may receive an input via the operator portal 205 to create a resource template. If so, control transfers to 1003; otherwise, control progresses to 1006.

At 1003, control obtains information about the resource template to be created. For example, the operator portal 205 may prompt the operator to provide a name and description of the template. The operator portal 205 may also prompt the operator to provide the category of the resources associated with the template—for example, local or global. Control continues with 1009, where control obtains information about one or more template elements. At 1002, control creates a resource template by storing the information about the resource template and the one or more template elements. For example, the operator portal 205 may store the information as a resource template in the management data store 215. Control then progresses to 1006.

At 1006, control determines whether an operator has requested to register a resource. If so, control continues with 1015; otherwise, control transfers to 1018. At 1015, control displays a list of resource templates. For example, the operator portal 205 may display a list of the resource templates stored in the management data store 215. At 1021, control obtains a selection of a resource template. For example, the data center management system 110 may receive an input via the operator portal 205 of a selection of one of the listed resource templates. Control progress to 1024, where control obtains information about the resource to be registered. For example, the operator portal 205 may prompt the operator to provide a name and a description of the resource and new values for templates elements that are not marked as read-only. The operator portal 205 may also prompt the operator to provide dependency information of the resource—for example, the parent resources and the child resources of the resource to be registered. At 1027, control registers the resource by storing the information about the resource. For example, the operator portal 205 may store the received information and the template elements as a resource record in the management data store 215. Control then progresses to 1018.

At 1018, control determines whether an operator has requested to generate a resource group. If so, control continues with 1030; otherwise, control transfers to 1033. At 1030, control obtains a selection of one or more registered resources. At 1036, control generates a list of resources based on the dependency information of the registered resources. At 1039, control organizes the resources in the list into one or more ordered components based on the dependency of each resource in the list. At 1042, control generates and stores a resource management page for the resources included in the generated list. Control then progresses to 1033.

At 1033, control determines whether an operator has requested to unlock a resource management page. If so, control continues with 1045; otherwise, control returns to 1001. At 1045, control prompts a manager to sign in to the management page. At 1048, control determines whether the manager's credentials are valid. For example, the operator portal 205 may provide credentials entered via the operator portal 205 to the authentication module 210 and receive an authorization status associated with the credentials from the authentication module 210. If the credentials are verified, control continues with 1051 of FIG. 10B; otherwise, control returns to 1001.

At 1051 of FIG. 10B, control determines whether the operator has requested to perform a failover from one data center to the other data center. If so, control continues with 1054; otherwise, control transfers to 1057. At 1054, control determines whether the operator requested to failover to the second data center 130. If so, control continues with 1060; otherwise; control transfers to 1063.

At 1060, control sets data center A (DCA) to the first data center 120 and sets data center B (DCB) to the second data center 130 and then control progress to 1066. At 1063, control sets data center A (DCA) to the second data center 130 and sets data center B (DCB) to the first data center 120 and then control progress to 1066. At 1066, control sets Group_Comp to the number of components in the resource group associated with the unlocked resource management page. Control also sets the current component (Current-_Comp) to one. Control then progresses to 1069.

At 1069, control stops all of the resources in the current component (Current_Comp) at data center A (DCA). Control then progresses to 1072, where control determines whether the current component (Current_Comp) is equal to the number of components in the resource group (Group-_Comp). If so, control continues with 1075; otherwise, control transfers to 1078. At 1078, control increments the current component (Current_Comp) by one and then control returns to 1069.

At 1075, control starts all of the resources in the current component (Current_Comp) at data center B (DCB). Control then progresses to 1081, where control determines whether the current component (Current_Comp) is the first component by determining whether Current_Comp is equal to one. If so, control continues with 1084, otherwise, control transfers to 1087. At 1087, control decrements the current component (Current_Comp) by one and then returns to 1075.

Returning to 1057, control determines whether the operator has requested to perform a task on a single resource in the resource group. If so, control continues with 1090; otherwise, control transfers to 1093. At 1090, control performs the requested tasked on the selected resource—for example, start, stop, or obtain the status of the selected resource. Control then progresses to 1084.

At 1093, control determines whether the operator has requested to perform a task on every resource included in a component. If so, control continues with 1096, otherwise, control returns to 1051. At 1096, control performs the requested task on each resource in the component—for example, start, stop, or obtain the status of each resource included in the selected component. Control then progresses to 1084.

At 1084, control determines whether the manager has locked the resource group management page by signing out of the unlocked resource management page. If so, control returns to 1001 of FIG. 10A; otherwise, control returns to 1051.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLU-ETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A data center management system comprising:
processor hardware; and
memory hardware coupled to the processor hardware, wherein the memory hardware stores:
  a set of resource records, wherein each resource record of the set of resource records includes (i) a name of a resource hosted at a first data center and a second data center, and (ii) dependency data of the resource;
  one or more resource templates; and
  instructions to be executed by the processor hardware, including:
    in response to receiving a selection of one or more resources via an operator portal, (i) generating a resource group based on the dependency data of the selected one or more resources, (ii) organizing resources in the resource group into one or more ordered components based on dependency data of each resource in the resource group, and (iii) generating a resource management page for the resource group;
    displaying the resource management page; and
    in response to receiving a failover request via the operator portal, stopping every resource in the resource group at the first data center and starting every resource in the resource group at the second data center,
  wherein each template of the one or more resource templates includes a set of control elements,
  wherein the instructions include, in response to receiving a request to register a new resource:

selecting a first template of the one or more resource templates;

obtaining (i) a name of the new resource and (ii) a description of the new resource; and in response to obtaining (i) the name of the new resource and (ii) the description of the new resource, adding a new resource record to the set of resource records, and wherein the new resource record includes the name of the new resource, the description of the new resource, and the set of control elements of the first template.

2. The data center management system of claim 1 wherein:

stopping every resource in the resource group at the first data center includes stopping each component of the one or more ordered components sequentially from a first component of the one or more ordered components to a last component of the one or more ordered components at the first data center;

stopping each component includes stopping each resource associated with the component;

starting every resource in the resource group at the second data center includes starting each component of the one or more ordered components sequentially from the last component to the first component at the second data center; and starting each component includes starting each resource associated with the component.

3. The data center management system of claim 2 wherein:

the dependency data of the resource includes at least one of a parent resource that must be stopped before the resource is stopped and a child resource that must be started before the resource is started;

the first component of the resource group includes only resources that do not have an associated parent resource; and the last component of the resource group includes only resources that do not have an associated child resource.

4. The data center management system of claim 1 wherein:

the request to register a new resource is received via the operator portal;

the selection of the first template is performed based on input from an operator; and the operator is prompted to provide (i) the name of the new resource and (ii) the description of the new resource.

5. The data center management system of claim 1 wherein each element of the set of control elements includes a label, a default value, an order value, and one or more associated tasks.

6. The data center management system of claim 5 wherein the one or more associated tasks includes at least one of start, stop, and status.

7. The data center management system of claim 1 wherein:

stopping every resource in the resource group at the first data center includes, for each resource in the resource group, (i) generating a stop instruction based on the set of control elements associated with the resource and (ii) executing the stop instruction at the first data center; and starting every resource in the resource group at the second data center includes, for each resource in the resource group, (i) generating a start instruction based on the set of control elements associated with the resource and (ii) executing the start instruction at the second data center.

8. The data center management system of claim 1 wherein the instructions include, in response to receiving a group status request, obtaining a status of each resource in the resource group at the first data center and the second data center.

9. The data center management system of claim 1 wherein the instructions include, in response to receiving a request to stop a selected component, stopping each resource associated with the selected component at one of the first data center and the second data center independent of dependency data of each resource associated with the selected component.

10. The data center management system of claim 1 wherein the instructions include, in response to receiving a request to start a selected resource, starting the selected resource at one of the first data center and the second data center independent of dependency data of the selected resource.

11. A data center management method comprising:

storing a set of resource records in a management data store, wherein each resource record of the set of resource records includes (i) a name of a resource hosted at a first data center and a second data center, and (ii) dependency data of the resource;

receiving a selection, via an operator portal, of one or more resources;

generating a resource group based on the dependency data of the selected one or more resources;

organizing resources in the resource group into one or more ordered components based on dependency data of each resource in the resource group;

generating a resource management page for the resource group;

displaying, via the operator portal, the resource management page to an operator;

in response to receiving, via the operator portal, a failover request, (i) stopping every resource in the resource group at the first data center and (ii) starting every resource in the resource group at the second data center;

storing one or more resource templates in the management data store, wherein each template of the one or more resource templates includes a set of control elements; and in response to receiving a request to register a new resource:

selecting a first template of the one or more resource templates;

obtaining (i) a name of the new resource and (ii) a description of the new resource; and adding a new resource record to the set of resource records, wherein the new resource record includes the name of the new resource, the description of the new resource, and the set of control elements of the first template.

12. The data center management method of claim 11 wherein:

stopping every resource in the resource group at the first data center includes stopping each component of the one or more ordered components sequentially from a first component of the one or more ordered components to a last component of the one or more ordered components at the first data center;

stopping each component includes stopping each resource associated with the component;

starting every resource in the resource group at the second data center includes starting each component of the one or more ordered components sequentially from the last component to the first component at the second data center; and starting each component includes starting each resource associated with the component.

13. The data center management method of claim 12 wherein:

the dependency data of the resource includes at least one of a parent resource that must be stopped before the resource is stopped and a child resource that must be started before the resource is started;

the first component of the resource group includes only resources that do not have an associated parent resource; and the last component of the resource group includes only resources that do not have an associated child resource.

14. The data center management method of claim 11 wherein:

the request to register a new resource is received via the operator portal: portal;

the selection of the first template is performed based on input from the operator; and the operator is prompted to provide (i) name of the new resource and (ii) the description of the new resource.

15. The data center management method of claim 11 wherein each element of the set of control elements includes a label, a default value, an order value, and one or more associated tasks.

16. The data center management method of claim 15 wherein the one or more associated tasks includes at least one of start, stop, and status.

17. The data center management method of claim 11 wherein:

stopping every resource in the resource group at the first data center includes, for each resource in the resource group, (i) generating a stop instruction based on the set of control elements associated with the resource and (ii) executing the stop instruction at the first data center; and starting every resource in the resource group at the second data center includes, for each resource in the resource group, (i) generating a start instruction based on the set of control elements associated with the resource and (ii) executing the start instruction at the second data center.

18. The data center management method of claim 11 further comprising, in response to receiving a group status request via the operator portal, obtaining a status of each resource in the resource group at the first data center and the second data center.

19. The data center management method of claim 11 further comprising, in response to receiving a request to stop a selected component, stopping each resource associated with the selected component at one of the first data center and the second data center independent of dependency data of each resource associated with the selected component.

20. The data center management method of claim 11 further comprising, in response to receiving a request to start a selected resource, starting the selected resource at one of the first data center and the second data center independent of dependency data of the selected resource.

* * * * *